W. MEHLHAF.
FAN.
APPLICATION FILED AUG. 29, 1919.
1,330,547.
Patented Feb. 10, 1920.
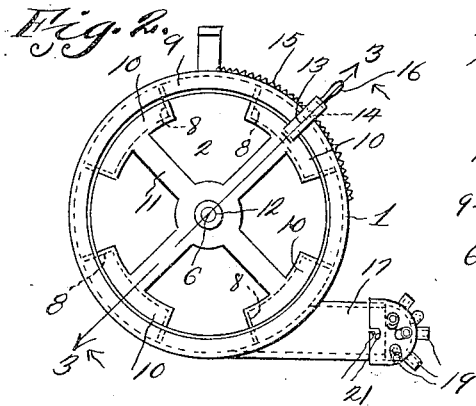
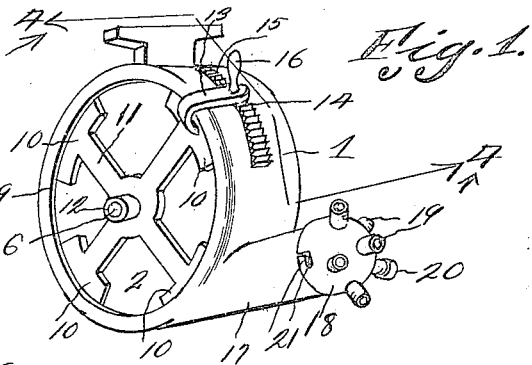
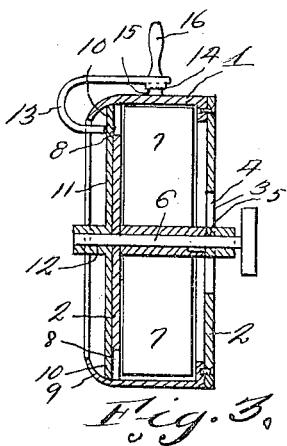
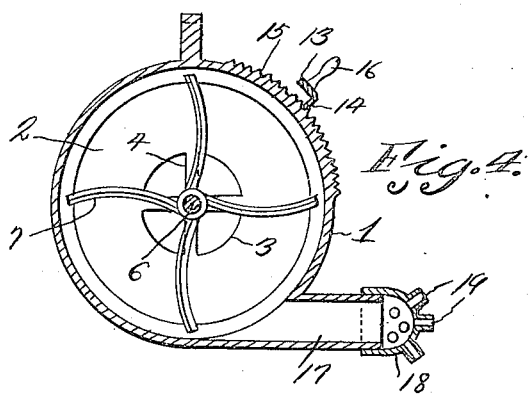
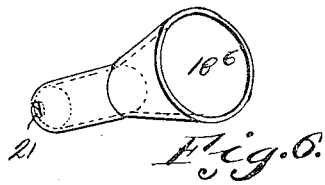
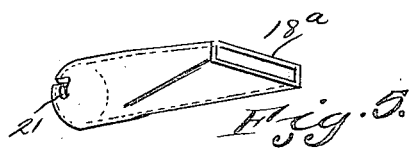
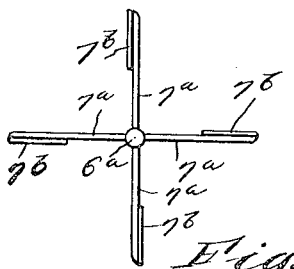
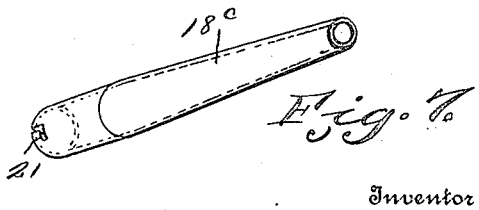
Inventor
William Mehlhaf
By Philip A. H. Ferrell
his Attorney

UNITED STATES PATENT OFFICE.

WILLIAM MEHLHAF, OF SUTTON, NEBRASKA.

FAN.

1,330,547. Specification of Letters Patent. Patented Feb. 10, 1920.

Application filed August 29, 1919. Serial No. 320,579.

*To all whom it may concern:*

Be it known that I, WILLIAM MEHLHAF, a citizen of the United States, residing at Sutton, in the county of Clay and State of Nebraska, have invented certain new and useful Improvements in Fans, of which the following is a specification, reference being had therein to the accompanying drawing.

The invention relates to centrifugal fans and has for its object to provide a fan of this type wherein the air from the same may be discharged tangentially or through the side casing of the fan when the tangential discharge is closed. Also to provide a discharge opening of the fan casing with semi-spherical cap, said cap having a series of discharge openings whereby the air will be directed to all parts of a room. Also to provide means whereby the openings of the semi-spherical cap may be closed, thereby causing the air to be discharged from the side of the fan casing through damper controlled openings.

A further object is to provide a fan particularly adapted for driving foul air from rooms and especially a fan for use in case of epidemics wherein the germs are carried in the air and are taken into the system of human beings through the nostrils, said fan being so constructed and provided with attachments so that the air from the tangential discharge may be caused to spread or if so desired be forced through a restricted opening, thereby getting the maximum force at any desired point.

With the above and other objects in view the invention resides in the combination and arrangement of parts as hereinafter set forth shown in the drawings, described and claimed, it being understood that changes in the precise embodiment of the invention may be made within the scope of what is claimed without departing from the spirit of the invention.

In the drawings:—

Figure 1 is a perspective view of the fan.

Fig. 2 is a side elevation, showing the casing discharge openings and the damper means for controlling the same.

Fig. 3 is a sectional view taken on line 3—3 of Fig. 2.

Fig. 4 is a sectional view taken on line 4—4 of Fig. 1.

Fig. 5 is a perspective view of a flared square discharge attachment for the tangential discharge pipe.

Fig. 6 is a round flared discharge attachment for the tangential discharge pipe.

Fig. 7 is a perspective view of a contracted discharge attachment for the tangential discharge.

Fig. 8 shows a modified form of fan.

Referring to the drawings, the numeral 1 designates the casing of the fan and 2 front and rear walls of said casing, the rear wall being provided with an intake port 3, said intake port having disposed therein a conventional form of spider in the bearing 5 of which a shaft 6 is rotatably mounted, said shaft carrying blades 7 of a centrifugal fan. The front wall 2 of the casing is provided with a series of discharge ports 8, said discharge ports being near the marginal edge of the front wall 2 where it merges into the casing 1. Extending outwardly and inwardly from the casing 1 and the front wall 2 is a circumferentially disposed flange 9, said flange forming means whereby as the air passes through the discharge opening 8 after the dampers 10 have been moved so as to open the ports 8, the air will be deflected inwardly to prevent the spreading of the air and allowing the air to be forced for a greater distance than in the ordinary fan. Dampers 10 are carried by a spider 11, which spider is pivotally mounted as at 12 on the shaft 6. One of said dampers 10 is provided with an outwardly and inwardly extending arm 13, the inner end of which is disposed under the fan casing 1 and is provided with a lug 14 adapted to slide over teeth 15 carried by the fan casing 1. Arm 13 has sufficient flexibility to allow the lug 14 to cam over the teeth 15 when the operator grasps the handle 16 to move the dampers in one direction or another.

When the dampers 10 are closed and the side delivery of the fan cut off the discharge may be through the tangential discharge pipe 17. The tangential discharge pipe 17 is adapted to receive attachments whereby the air, as it leaves the discharge pipe 17 may be spread or contracted as desired in Figs. 1, 2 and 4, the attachment 18 comprises a semi-spherical member having a series of discharge openings 19. Said discharge openings 19 being so disposed that the air as it leaves the discharge pipe 17 will be directed at different angles throughout the room, thereby effectively forcing fresh air to the room, especially when the fan is placed so that it gets its intake air from the atmosphere outside a building. The discharge passages may be closed by means of cap 20 so as to reduce the number of openings 19, however when the discharge is through the ports 8 all of the openings 19 are closed. Attachment 18 is secured to the end of the discharge pipe 17 by means of a bayonet slot and lug joint 21.

Figs. 5 and 6 show attachments 18$^a$ and 18$^b$. Attachment 18$^a$ has its discharge opening flared and square whereby the current of air as it leaves the discharge pipe 17 will be allowed to spread. Attachment 18$^b$ will allow the current of air to spread but will be round.

Referring to Fig. 7 the attachment 18$^c$ has its discharge opening 18$^d$ contracted thereby contracting the current of air so that the same will carry for a considerable distance.

Referring to the modified form of fan as shown in Fig. 8, the shaft 6$^a$ is provided with radial arms 7$^a$, at the ends of which fan blades 7$^b$ are attached.

The invention having been set forth what is claimed as new and useful is:—

1. A centrifugal fan comprising a casing, a rotating fan in said casing, one side of said casing having an intake port, the other side of the casing having a series of marginally disposed discharge ports, damper means for controlling said discharge ports, a tangentially disposed discharge pipe carried by the casing, means for closing said tangentially disposed discharge as desired, thereby allowing the fan to discharge either through the tangential discharge or the discharge ports in the side of the casing.

2. A centrifugal fan comprising a casing, a rotating fan in said casing, one side of said casing having an intake port, the other side of the casing having a series of marginally disposed discharge ports, an annular flange carried by the casing adjacent the outer marginal edges of the side discharge ports and inclined inwardly for contracting the current of air as it leaves the side ports, damper means for controlling said side discharge, a tangentially disposed discharge port, means carried by said tangentially disposed discharge port whereby the discharge will be directed through a series of discharge openings located and disposed at various angles radially from a central point and means whereby said last named series of discharge openings may be closed for reducing the number of openings or for causing the fan to discharge through the discharge openings in the side of the casing.

3. A centrifugal fan comprising a casing, a rotating fan in said casing, one side of said casing having an intake port, the other side of the casing having a series of marginally disposed discharge ports, an annular flange carried by the casing adjacent the outer marginal edge of the side discharge ports and inclined inwardly for contracting the current of air as it leaves the side ports, dampers rotatably mounted on the fan shaft for controlling said discharge ports, said dampers having a controlling lever comprising an outwardly and inwardly extending spring arm, said arm at its inwardly extending end engaging a series of inclined teeth carried by the casing and adapted to ride over said teeth for adjusting the dampers to various positions and maintaining the same in said position, a tangentially disposed discharge pipe carried by the casing and means carried by said tangentially disposed discharge pipe whereby the air from the fan may be forced to leave the casing through the side discharge openings.

In testimony whereof I hereunto affix my signature.

WILLIAM MEHLHAF.